US012737439B2

(12) United States Patent
Maharramov et al.

(10) Patent No.: US 12,737,439 B2
(45) Date of Patent: Sep. 15, 2026

(54) BIOMETRIC VERIFICATION USING BIOMETRIC FEATURE TRANSFORMATION

(71) Applicant: Samsung Electronics Co., Ltd., Suwon-si (KR)

(72) Inventors: Musa Maharramov, The Woodlands, TX (US); Kathleen Hajash, Sunnyvale, CA (US); Brian Patton, San Francisco, CA (US); Jeong Kim, Suwon (KR); Jaewoong Choi, Gangnam-Gu Seoul (KR); Dean Reading, Surfers Paradise (AU)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 18/597,051

(22) Filed: Mar. 6, 2024

(65) Prior Publication Data

US 2025/0284783 A1 Sep. 11, 2025

(51) Int. Cl.
*G06F 21/00* (2013.01)
*G06F 21/32* (2013.01)

(52) U.S. Cl.
CPC .................................... *G06F 21/32* (2013.01)

(58) Field of Classification Search
CPC ....................................................... G06F 21/32
See application file for complete search history.

(56) References Cited

U.S. PATENT DOCUMENTS 6,314,197 B1 * 11/2001 Jain .................... G06V 40/1365 382/125
7,454,624 B2 11/2008 LaCous
9,558,415 B2 * 1/2017 Paul ........................ G06F 21/32
11,115,214 B2 9/2021 Kaga
11,615,176 B2 3/2023 Jindal
11,688,403 B2 6/2023 Han (Continued)

FOREIGN PATENT DOCUMENTS

JP 2010-146245 A 7/2010
KR 10-2483650 B1 1/2023

OTHER PUBLICATIONS

Y. Wang, S. Rane, S. C. Draper and P. Ishwar, "A Theoretical Analysis of Authentication, Privacy, and Reusability Across Secure Biometric Systems," *in IEEE Transactions on Information Forensics and Security*, vol. 7, No. 6, pp. 1825-1840, Dec. 2012, doi: 10.1109/TIFS.2012.2210215.

(Continued)

*Primary Examiner* — William A Corum, Jr.

(57) ABSTRACT

In one embodiment, a method includes accessing query biometric data associated with a verification request for a user. The method further includes applying a transformation to the query biometric data to generate a transformed query template representing the query biometric data and accessing a transformed enrollment template comprising transformed enrollment biometric data of the user. The method further includes determining, based on a scoring function comparing the transformed query template and the transformed enrollment template, a plurality of similarity scores, each similarity score associated with a different value of a scoring parameter; and determining, based on the plurality of determined similarity scores, whether to grant or deny the verification request.

26 Claims, 4 Drawing Sheets

(56) References Cited

U.S. PATENT DOCUMENTS

| | | | | |
|---|---|---|---|---|
| 11,711,216 | B1 * | 7/2023 | Poh | G06F 21/32 713/186 |
| 2006/0235729 | A1 | 10/2006 | Braithwaite | |
| 2009/0113209 | A1 * | 4/2009 | Lee | G06F 21/32 713/186 |
| 2012/0204035 | A1 * | 8/2012 | Camenisch | G06F 21/32 713/186 |
| 2014/0044322 | A1 | 2/2014 | Kumar | |
| 2016/0358010 | A1 * | 12/2016 | Yang | G06V 40/1353 |
| 2017/0243042 | A1 * | 8/2017 | Walch | G06V 40/70 |
| 2017/0344805 | A1 * | 11/2017 | Yang | G06F 16/5854 |
| 2019/0122024 | A1 | 4/2019 | Schwartz | |
| 2020/0127839 | A1 * | 4/2020 | Alzahrani | H04L 9/3231 |
| 2021/0194874 | A1 * | 6/2021 | Herder, III | G06N 3/04 |
| 2022/0122375 | A1 | 4/2022 | Krueger | |
| 2022/0319258 | A1 | 10/2022 | Kloepfer | |
| 2023/0012235 | A1 | 1/2023 | Wu | |
| 2023/0179596 | A1 | 6/2023 | Schonberger | |

OTHER PUBLICATIONS

J. J. Engelsma, K. Cao and A. K. Jain, "Learning a Fixed-Length Fingerprint Representation," *in IEEE Transactions on Pattern Analysis and Machine Intelligence*, vol. 43, No. 6, pp. 1981-1997, Jun. 1, 2021, doi: 10.1109/TPAMI.2019.2961349.

N. K. Ratha, J. H. Connell and R. M. Bolle, "Enhancing security and privacy in biometrics-based authentication systems," *in IBM Systems Journal*, vol. 40, No. 3, pp. 614-634, 2001, doi: 10.1147/sj.403.0614.

N. K. Ratha, S. Chikkerur, J. H. Connell and R. M. Bolle, "Generating Cancelable Fingerprint Templates," *in IEEE Transactions on Pattern Analysis and Machine Intelligence*, vol. 29, No. 4, pp. 561-572, Apr. 2007, doi: 10.1109/TPAMI.2007.1004.

Y. Sutcu, Q. Li and N. Memon, "Protecting Biometric Templates With Sketch: Theory and Practice," *in IEEE Transactions on Information Forensics and Security*, vol. 2, No. 3, pp. 503-512, Sep. 2007, doi: 10.1109/TIFS.2007.902022.

S. Tulyakov, F. Farooq, P. Mansukhani, V. Govindaraju, "Symmetric hash functions for secure fingerprint biometric systems", in Pattern Recognition Letters, vol. 28, Issue 16, 2007, pp. 2427-2436.

M. Ferrara, D. Maltoni and R. Cappelli, "Noninvertible Minutia Cylinder-Code Representation," *in IEEE Transactions on Information Forensics and Security*, vol. 7, No. 6, pp. 1727-1737, Dec. 2012, doi: 10.1109/TIFS.2012.2215326.

C. Moujahdi, G. Bebis, S. Ghouzali, M. Rziza, "Fingerprint shell: Secure representation of fingerprint template", in Pattern Recognition Letters, vol. 45, 2014, pp. 189-196, ISSN 0167-8655, https://doi.org/10.1016/j.patrec.2014.04.001.

J. Hu, S. Lee, I. R. Jeong, "On the Unlinkability of Fingerprint Shell", in "Security and Communication Networks", Hindawi, 2020, https://doi.org/10.1155/2020/8256929.

D. Maltoni, D. Maio , A. K. Jain , J. Feng, "Handbook of Fingerprint Recognition", select annotated portions of section 4.4, Springer, 2022.

A. K. Jain, A. A. Ross, K. Nandakumar, "Introduction to Biometrics", pp. 4-8, Springer, 2011.

K. Cao and A. K. Jain, "Learning Fingerprint Reconstruction: From Minutiae to Image," in *IEEE Transactions on Information Forensics and Security*, vol. 10, No. 1, pp. 104-117, Jan. 2015, doi: 10.1109/TIFS.2014.2363951.

K. Nandakumar and A. K. Jain, "Biometric Template Protection: Bridging the performance gap between theory and practice," *in IEEE Signal Processing Magazine*, vol. 32, No. 5, pp. 88-100, Sep. 2015, doi: 10.1109/MSP.2015.2427849.

NIST Special Database 302, NIST Technical Note 2007, National Institute of Standards and Technology,2007, https://nvlpubs.nist.gov/nistpubs/TechnicalNotes/NIST.TN.2007.pdf.

NIST Special Database 301, NIST Technical Note 2002, National Institute of Standards and Technology,2002, https://nvlpubs.nist.gov/nistpubs/TechnicalNotes/NIST.TN.2002.pdf.

NIST Special Database 300, NIST Technical Note 1993, National Institute of Standards and Technology, 1993, https://nvlpubs.nist.gov/nistpubs/TechnicalNotes/NIST.TN.1993.pdf.

NIST Biometric Image Software (Nbis), Nbis Release 5.0.0, Feb. 10, 2010, National Institute of Standards and Technology, 2010, https://www.nist.gov/services-resources/software/nist-biometric-image-software-nbis.

Measuring Biometric Unlock Security, https://source.android.com/docs/security/features/biometric/measure.

S. Pankanti, S. Pranhakar, A. K. Jain. (2002) On the individuality of fingerprints. IEEE Transactions on Pattern Analysis and Machine Intelligence, 24(8), pp. 1010-1025.

J. Chen, Y. S. Moon. (2208). The statistical modelling of fingerprint minutiae distribution with implications for fingerprint individuality studies. In Proceedings of International Conferences on Computer Vision and Pattern Recognition (CVPR08) pp. 1-7.

Y. Dodis, R. Ostrovsky, L. Reyzin, A. Smith. (2008) Fuzzy extractors How to generate strong keys from biometrics and other noisy data. SIAM Journal on Computing, 38(1).

International Search Report and Written Opinion in International Application No. PCT/KR2024/010636.

* cited by examiner

BIOMETRIC VERIFICATION USING BIOMETRIC FEATURE TRANSFORMATION

TECHNICAL FIELD

This application generally relates to biometric verification using biometric feature transformation.

BACKGROUND

Biometric data represents a unique physical characteristic of a person, such as a fingerprint, iris pattern, facial images, or other uniquely identifying biometric trait. Biometric data can provide convenient authentication for users in a variety of use cases, including access to electronic devices, access to physical spaces, and access to information. For example, biometric data such as a user's fingerprint can be used to unlock a lock screen of a smartphone, to gain access to a secure facility, or to validate a user's identity in order to access the user's confidential information, such as financial records or medical records.

DESCRIPTION OF EXAMPLE EMBODIMENTS

Figure 1:
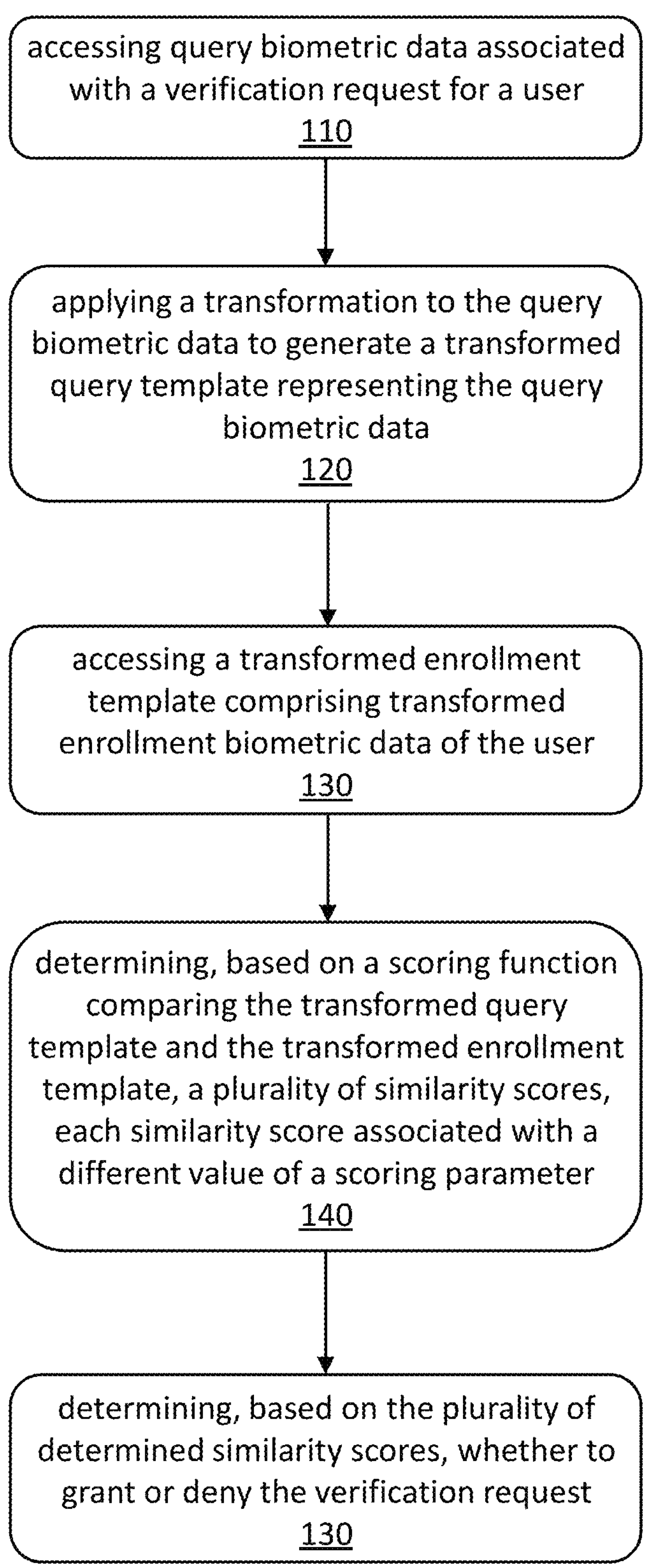
FIG. 1 illustrates an example method for validating biometric data using biometric feature transformation.

Biometric data represents a unique physical characteristic of a person, such as a fingerprint, iris pattern, facial images, or other uniquely identifying biometric trait. Biometric data can provide convenient authentication for users in a variety of use cases, including access to electronic devices, access to physical spaces, and access to information. For example, biometric data such as a user's fingerprint can be used to unlock a lock screen of a smartphone, to gain access to a secure facility, or to validate a user's identity in order to access the user's confidential information, such as financial records or medical records. However, the consequences of a data breach can be serious: if a user's conventional alphanumeric password is stolen then they can simply update their password, but a user cannot update their fingerprints or other biometric data. If a malicious party gains access to a person's biometric data, the data can reveal the owner's identity or can be used to gain unwarranted access using the biometric data.

Measurement of a biometric results in a numerical representation of the biometric data known as a biometric template. In the case of fingerprints, this representation can be coordinates, types, and orientations of minutiae (features of the fingerprint pattern); for irises the representation may be a wavelet representation of the iris; and for facial images the representation may be linear discriminant analysis coefficients for a mathematical image representation or encoding that yield a template. For instance, for fingerprints, minutiae represent small imperfections in the ridge pattern. Digitizing the coordinates, types, and orientations of these minutiae results in a template defined by a numerical table. As explained below, performing a mathematical transformation on this table yields a transformed template. In general, biometric data can include one or more of a set of measured fingerprint minutiae; a mathematical representation such as a dimension-reducing encoding or a decomposition in a custom basis of an ocular iris image; a mathematical representation such as a dimension-reducing encoding or decomposition in a custom basis of a retinal blood vessel image; a mathematical representation of an image such as a dimension-reducing encoding, decomposition in a custom basis, or a set of linear discriminant analysis coefficients of a facial image; a mathematical representation of motion (e.g., gait) such as a wavelet-based or Fourier spectral decomposition of estimated joint rotations of a human skeleton; a mathematical representation of acoustic signatures such as a wavelet-based or Fourier spectral decomposition of human speech; or a mathematical decomposition of a cartesian product of any of the above data in a multimodal biometric identification or authentication.

Verification using biometric data involves an enrollment process, in which an authentication system measures a user's biometric template and stores the template in a database as the enrollment biometric signature or the original signature. This is typically done one time, when the user is first entered into the system. Once enrolled, a particular validation request involves a query process in which the user's biometric information is measured again and converted into a template, resulting in the query biometric signature. The query biometric signature and the original signature likely will not be 100% identical for a variety of reasons, including that imaging sensors have noise; different areas of the biometric (e.g., fingerprint) may be captured in different measurements; skin is flexible, resulting in deformation of biometric features; etc.

In the authentication or verification process, the system determines whether the query signature is similar enough to the enrollment signature to indicate that the biometric data came from the same person. This similarity is calculated numerically based on a comparison of the numerical representations of the query templates and the enrollment. A quantitative threshold is used to convert a similarity metric into a binary (match=verified/no-match=not verified) classification. If the threshold is set too high, the system will report a high number of false negatives, in which a valid verification request is rejected because the system has incorrectly determined that the query signature doesn't match the enrollment signature. If the threshold is set too low, the system will report a high number of false positives, in which biometrics from people who aren't the user are mistaken as a biometric from the user. In practice, it is essentially impossible to achieve false positive and false negative rates that are both zero, and therefore correctly tuning the match/no-match threshold has a significant impact on the usability and security of a biometric verification system.

Current approaches to biometric template protection can be broadly categorized into two classes: biometric cryptosystems and feature transformation methods. Biometric cryptosystems store the biometric templates in an ostensibly secure manner, e.g., through software encryption or in a secure hardware vault, but this approach requires careful design of the encryption system, and can be subject to consumer skepticism, industry-wide scrutiny, and significant regulation. Feature transformation methods use the enrollment/query method described above, but perform an irreversible transformation on biometric templates to generate transformed templates. Because the transformation is ostensibly irreversible, an unauthorized entity that obtains the transformed template will be unable to reconstruct the original biometric template or its corresponding biometric signature. In feature transformation, only the transformed templates are stored and compared in the enrollment and query processes. In determining whether two transformed templates (enrollment and query) match, the system may also take into account auxiliary data, such as a password, for multi-factor authentication.

In practice, no useful template transformation is truly irreversible, and the concept of irreversibility is a continuum, rather than a binary distinction. Therefore, feature-transformation approaches must take into account the degree of irreversibility of any given approach, and the ideal transformation would be computationally impossible to invert (i.e., cannot be inverted within a feasible time frame) on modern or envisioned future computing hardware.

All transformation approaches exhibit a tradeoff between their irreversibility and accuracy. For instance, trivially simple transformations would maximally preserve all the features in the original template and ensure high accuracy in the query step, but would be likewise trivial to invert, thereby compromising security. Highly complex transformations that are computationally impossible to invert may generate significantly different transformed templates for two very similar inputs (e.g., fingerprints scanned at slightly different angles), which increases the false negative rate in queries. One metric of accuracy is the best achievable equal error rate (EER)—i.e., the rate of false positives or false negatives when the threshold is tuned so as to make those two rates equal. The EER is one convenient measure of the discriminative power (accuracy) of a matching algorithm. EERs of roughly 2% are typical for feature transformation methods, which means that a well-tuned similarity threshold will reject a valid user 2% of the time and will also authenticate an invalid user 2% of the time.

The techniques of this disclosure provide computationally tractable feature transformations while simultaneously ensuring high irreversibility and high accuracy, for example by using a statistical analysis of multi-parameter similarity measures in the comparison of transformed templates. The techniques described herein provide biometric authentication and identification that protects users' biometric data by storing biometric signatures in a format that cannot be used to reconstruct or recreate the user's biometric traits. This allows, among other things, public sharing of a user's transformed biometric template without privacy concerns, as the template is irreversible. Then, for example, the user's transformed enrollment template may be shared from the device used originally for enrollment (e.g., a smartphone) to all nearby devices that support this algorithm, thus enabling setup-free authentication and identification.

By using the techniques described in this disclosure, particular embodiments can achieve a relatively low EER (e.g., of ~2%) with much greater security that is typically associated with such EERs, because the techniques described herein provide accurate verification determinations for highly secure template transformations.

FIG. 1 illustrates an example method for validating biometric data using biometric feature transformation. Step 110 of the example method of FIG. 1 includes accessing query biometric data associated with a verification request for a user. The query biometric data may be based on any type of biometric, such as fingerprints, irises, retinal blood vessel patterns, facial features, etc. In particular embodiments, step 110 may include measuring the biometric and generating the query biometric data. For example, accessing the biometric data may include obtaining the biometric data, for example by obtaining a representation of a user's fingerprint from a fingerprint scanner, a representation of a user's iris, etc. In particular embodiments, accessing the biometric data may include receiving the biometric data from another source, for example from a device that measured the biometric data or from an intermediary device.

As explained more fully herein, a verification request may be for any suitable access. For example, a verification request may be for a user to unlock a computing device (e.g., a smartphone, a wearable, a personal computer, an extended-reality (XR) device, etc.), which may be the computing device that performs some or all of the steps of the example method of FIG. 1. As another example, a verification request may be for a user to access data or access a physical space.

Figure 2:
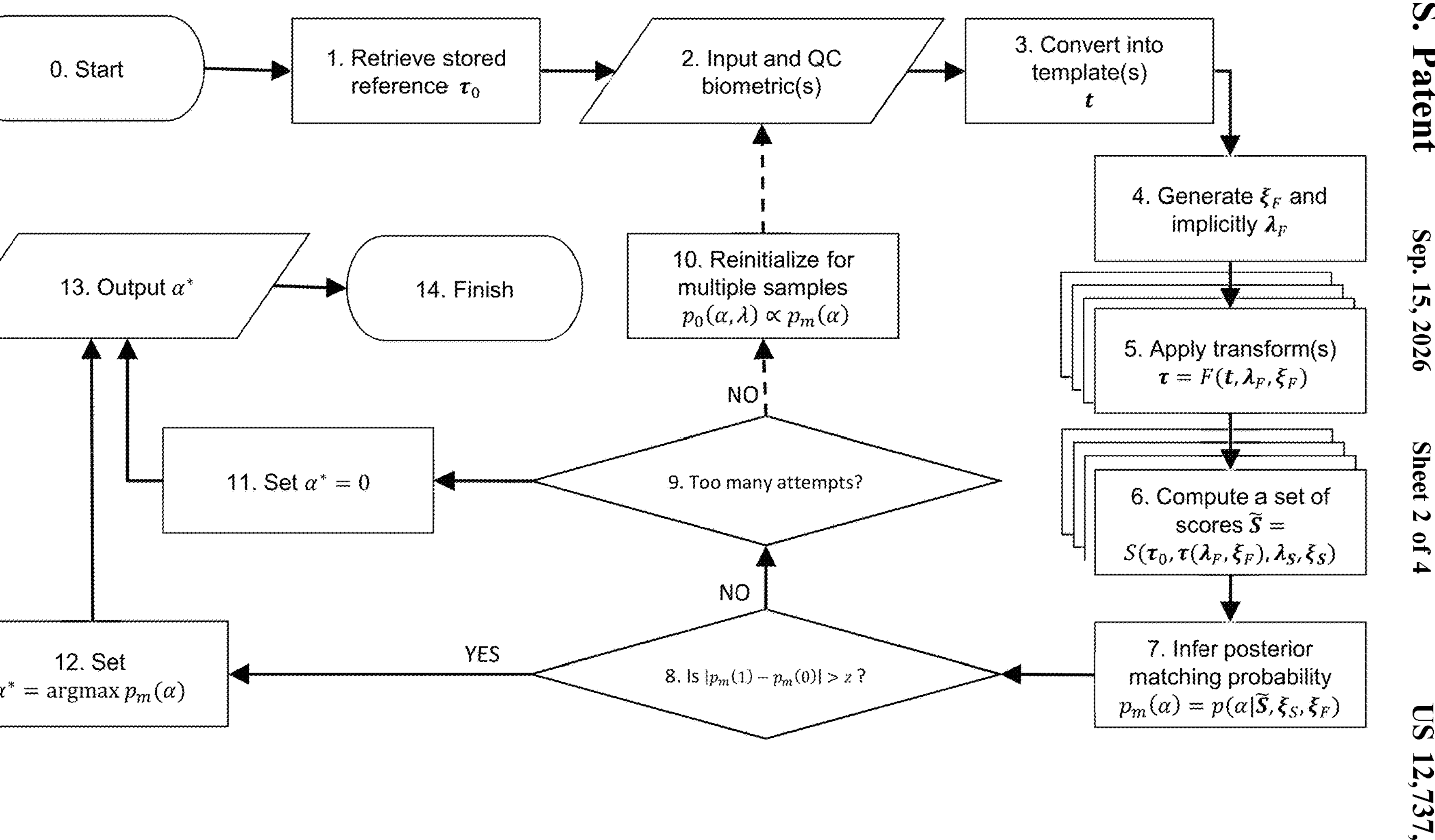
FIG. 2 illustrates an example implementation of the example method of FIG. 1.

FIG. 2 illustrates an example implementation of the example method of FIG. 1, among other things. Step 110 of FIG. 1 may include step 2 of FIG. 2, which includes obtaining a user's biometric input and performing some post-processing on the input, if necessary. Step 110 may also include step 3, which involves converting the input (and possibly processed) biometric data into one or more template representations of the biometric data. For instance, the query biometric data of step 110 may be the template data t of the input biometric data. In particular embodiment, steps 2 and 3 of the example implementation of FIG. 2 may be performed prior to step 110 of the example method of FIG. 1, so that step 110 is met by accessing the template t generated in step 3. The template t is subsequently used as described below, but usually will then be discarded (i.e., won't be stored in a permanent computer storage) so as to minimize security risks.

In the following discussion, t represents a vector of raw biometric data structures $t_1, t_2 \ldots, t_n$, which comprise the biometric template. The "uniqueness" of a biometric trait or signature is interpreted within the commonly acceptable limits of individuality and uniqueness associated with the corresponding type of raw biometric data. For example, while fingerprints are unique, widely used digital forms of fingerprint minutia templates can be considered unique within a group of tens of thousands of random individuals.

Step 120 of the example method of FIG. 1 includes applying a transformation to the query biometric data to generate a transformed query template representing the query biometric data. For example, a numerical representation of fingerprint minutiae obtained by measuring a fingerprint biometric may be transformed to another numerical representation. In this example, the transformed numerical representation of the fingerprint minutiae would be the transformed query biometric data.

In this disclosure, biometric templates are transformed into transformed templates using a template transformation mapping F:

$$\tau = F(t, \lambda_F, \xi_F) \tag{1}$$

where mapping F is such that neither the template(s) t nor the original biometric trait used to produce t can be reconstructed sufficiently given τ to allow any effective use of the reconstructed template in place of t for purposes of secure authentication or identification (i.e., the mapping F results in a sufficiently irreversible mapping). In (1), vector $\xi_F$ denotes explicit parameters (e.g., parameters that can be specified by the user or the algorithm when performing mapping F), and $\lambda_F$ is a vector of latent parameters, such as randomly generated parameters for stochastic mappings F. As explained more fully herein, mapping (1) depends on explicit and latent parameters, which in particular embodiments results in multiple simultaneous transformed templates. Moreover, in particular embodiments, domain-specific template transformations (1) may be automatically generated using statistical-inference and optimization techniques described herein.

In particular embodiments, (1) can denote the example transformation (8) or (13) of an example minutia template (6). However, (1) may also represent any generative operator such as a feed-forward neural network with weights determined to statistically reduce invertibility of the untransformed template t, as discussed more fully herein. In the example implementation of FIG. 2, parameter selection and transformation (1) are performed in steps 4 and 5 of FIG. 2, after template(s) t are extracted from input biometrics in step 3.

Particular embodiments may use a template transformation that involves a parameterized function and collisionful hash. For example, a biometric trait can be converted into an equivalent "template" made up of L+k-tuples of $$t_i = (x_i^1, \ldots, x_i^L, c_i^1, c_i^2, \ldots, c_i^k), i = 1, \ldots, n, \quad (2)$$

where $$x_i^1, \ldots, x_i^L$$

are real-valued coordinates of some biometric feature (for example, a minutia for $$L = 2) \text{ and } c_i^1, c_i^2, \ldots, c_i^k$$

are some quantized (i.e., integer-valued) properties of the feature (see equations 6 and 7, below). A transformation (2) into a transformed biometric template T may be:

$$T = \{r_i\}, i = 1, \ldots, N_{ref} \leq n(n-1)/2, \quad (3)$$

where $r_i$ are scalar or vector quantities selected from the set of values:

$$f(x_i^1, \ldots, x_i^L, x_j^1, \ldots, x_j^L, c_i^1, c_i^2, \ldots, c_i^k, c_j^1, c_j^2, \ldots, c_j^k, \theta_f), \quad (4)$$
$$i, j = 1, \ldots, n, i \neq j,$$

and where a scaler or vector-valued function f may be described analytically, algorithmically, or numerically (i.e., as a lookup table) and parameterized using a parameter vector $\theta_f$. For example:

$$f(x_i^1, \ldots, x_i^L, x_j^1, \ldots, x_j^L, c_i^1, c_i^2, \ldots, c_i^k, c_j^1, c_j^2, \ldots, c_j^k, \theta_f) = \quad (5)$$
$$(d(x_i^1, \ldots, x_i^L, x_j^1, \ldots, x_j^L, \theta_f), h(s(c_i^1, c_j^1), \ldots, s(c_i^k, c_j^k))),$$

where $$d(x_i^1, \ldots, x_i^L, x_j^1, \ldots, x_j^L, \theta_f)$$

is a parameterized function of two L-dimensional points, s(x, y) returns its arguments numerically sorted, and h( ) is a collisionful (i.e., irreversible) hash function (see equations 8-12, below). For purposes of demonstration, template transformations (4) and (5) define mappings of coordinates and other attributes of pairs of minutiae indexed by i,j=1, . . . , n. However, in particular embodiments the transformations are evaluated for general tuples of minutiae, such as triples, quadruples, etc., of a fixed or variable size as may be prescribed by a particular transformation procedure.

As an example of a particular template transformation, the following discussions uses an example in which the biometric is a fingerprint and the distinctive biometric features obtained from the biometric data are fingerprint minutiae, although the disclosure herein may be used for any distinctive biometric features from any suitable biometric data produced by a measurement of any suitable biometric.

A template of n minutiae in a fingerprint image can be represented mathematically as a collection of quadruplets $$m_i = (x_i, y_i, \tau_i, \theta_i), i = 1, \ldots, n, \quad (6)$$

where $x_i$, $y_i$ are the spatial coordinates of individual minutiae $m_i$ captured in the fingerprint imaging process; $\tau_i \in \{0, \ldots, n_\tau - 1\}$, $n_\tau \geq 2$ are minutia types/categories (e.g., a ridge, a bifurcation, etc., each of which have distinctive attributes); and $\theta_i \in \{1, \ldots, n_\Theta - 1\}$ are discretized minutia orientations measured from a fixed axis in increments of $2\pi/n_\Theta$ radians. In particular embodiments, $n_\tau=2$, i.e., two types of minutiae (e.g., ridge endings and bifurcations) may be used, although any suitable number of minutiae may be used. In particular embodiments, $n_\Theta \geq 8$. Tuples (6) can be expanded with other types of local information such as local ridge frequency $f_i \in \{1, \ldots, n_f\}$ and width $w_i \in \{1, \ldots, n_w\}$ that are biometric invariants (i.e., do not vary over time for a particular person) and can be quantized:

$$m_i = (x_i, y_i, \tau_i, \theta_i, f_i \cdot w_i, \ldots), i = 1, \ldots, n \quad (7)$$

Typical non-transformed template-based fingerprint verification methods attempt to establish a translational and rotational correspondence between the largest possible subsets of minutiae (usually after rescaling). This approach can be augmented by using "local context" such as non-minutia characteristics as in (2) or local minutia geometry as in cylinder codes. However, non-transformed template-based methodologies cause privacy concerns, because a high-fidelity synthetic fingerprint can be reconstructed from a non-transformed template (6) and used to gain unauthorized access to template-based biometric systems. Non-transformed fingerprint templates, such as in equations 6 and 7, are therefore considered identity-revealing private information and regulated as such, and the same analysis applies to non-transformed templates of any biometric.

In contrast, feature transformation methods anonymize templates (e.g., 6) so as to prevent recovery of the original biometric information (or its facsimile) while preserving sufficient information for accurate verification. For instance, particular embodiments disclosed herein use a template transformation that takes the input template entries $m_i$ and calculate pairwise "distance-type" metrics $e_{ij}$ for all pairs $(m_i, m_j)$. For example, a transformed template T may be:

$$T = \{e_{ij}, \ldots\} \; e_{ij} = (r_{ij}, \phi_{ij}, \tau_i, \tau_j), \; 1 \le i < j \le n \tag{8}$$

where $r_{ij}$ is the relative distance between the two minutiae, $\phi_{ij}$ is the difference in their orientation angles, and $\tau_i$, $\tau_j$ are the respective minutia types. More generally, $r_{ij}=d(x_i, x_j, y_i, y_j)$ is a non-invertible scalar or vector function of the minutiae coordinates and $\phi_{ij}=\min(\theta_i-\theta_j+n_\theta \bmod n_\theta, \theta_j-\theta_i+n_\theta \bmod n_\theta)$ is their relative rotation angle. Note that $\phi_{ij}$ for any pair of minutiae is independent of a global rotation of the fingerprint image. Particular embodiments may use a Cartesian distance metric, e.g., $r_{ij}=\sqrt{(x_i-x_j)^2+(y_i-y_j)^2}$, but other metrics (e.g., other norms) may be used. Equation (8) identifies a specific example of a template transformation that converts template coordinates into relative distances between pairs of biometric features. If the original template had n entries, the transformed template will have n(n−1)/2 entries $e_{ij}$. As discussed above, template transformations in particular embodiments may be based on evaluating analytically or algorithmically defined functions of general tuples of minutiac. In such embodiments, the elements of transformed template (8) will be tuple attributes that can be indexed by tuple multi-indexing. For example, an attribute of transformed minutiae triples can be a scalar array $c_{i,j,k}$ $1 \le i<j \le k \le n$. Examples of such attributes are the area or perimeter of a polygon formed by a tuple of minutiae, statistical or geometric characterizations of the shape of such polygons, or any other quantitative or categorical attributes that can be associated with such tuples of minutiae. All subsequent discussions apply to such transformed tuple attributes with appropriate modifications: distance and angle tolerances and other explicit and latent parameters mentioned below should be replaced with the corresponding tolerances and parameters associated with the transformed tuple attributes.

As illustrated in the example implementation of FIG. 2, particular embodiments may generate multiple transformed query templates as part of a verification process. For example, step 5 of FIG. 2 illustrates generating multiple transformed query templates, with each transformed template sampling a different number of biometric features (e.g., minutiae) from the template generated in step 3. This sampling may be random. As illustrated in the example of FIG. 2 and explained below, each transformed template may correspond to a set of scores, and these sets of scores may be used to infer the probability that the query biometric is in fact the enrollment biometric.

Step 130 of the example method of FIG. 1 includes accessing a transformed enrollment template that includes transformed enrollment biometric data of the user. As discussed above, the enrollment process occurred prior to the verification request of the method of FIG. 1. For instance, a user may supply biometric data (e.g., a number of fingerprint measurements) on request, and this enrollment biometric data represents an enrollment template, which is then transformed (e.g., as illustrated in equations (1), (3), and (8)). This transformed enrollment template is then stored for future accesses, for example by step 130 of the method of FIG. 1. In particular embodiments, a transformed enrollment template may be stored on a user's device, e.g., on a device to which a verification request pertains. In particular embodiments, a transformed enrollment template may be stored on, e.g., a server computing device, and step 130 may include obtaining the transformed enrollment template from that device. As illustrated in the example implementation of FIG. 2, a transformed enrollment template (e.g., template $\tau_0$ in the example of FIG. 2) may be obtained prior to accessing query biometric data (e.g., steps 110 and 130 may be performed in any order).

Step 140 of the example method of FIG. 1 includes determining, based on a scoring function comparing the transformed query template and the transformed enrollment template, a plurality of similarity scores, each similarity score associated with a different value of a scoring parameter.

The scoring function may be based on one or more similarity measures between distinctive biometric features used in the generation of a transformed enrollment template and a transformed query template. For instance, continuing the particular transformation described in equation 8, a similarity for transformed templates may be based on comparing the lengths or weights of segments connecting the individual minutiae of each template. For example, if (8) represents a transformed enrollment template $\tau_{enrollment}$, and:

$$T_{query} = \{e'_{ij}, \ldots\} \; e'_{ij} = (r'_{ij}, \phi'_{ij}, \tau'_i, \tau'_j), \; 1 \le i < j \le m \tag{9}$$

is a transformed query template, then particular embodiments can define a measure of similarity between the transformed sets (8) and (9) in terms of the number of pairs of indices i<j and k<l for which the individual quadruplets are quantitatively similar. The similarity may be based on one or more of the following metrics:

$$|r_{ij} - \delta r'_{kl}| \le \epsilon_{dist}, \tag{10}$$

$$|r_{ij} - \delta r'_{kl}|/r_{ij} \le \epsilon'_{dist}, \tag{10'}$$

$$|\phi_{ij} - \phi'_{kl}| \le \epsilon_{ang}, \tag{11}$$

$$f(\tau_i, \tau_j, \ldots) = f(\tau'_k, \tau'_l, \ldots) \tag{12}$$

Either the absolute distance (10) or normalized distance (10') conditions may be used when determining the number of matching elements between (8) and (9) (in this example, each quadruplet in an entry $e_{ij}$ is an element). In equations (10-12), 8 is a scaling parameter (e.g., for fingerprints, this reflects the fact that enrollment and query prints may be captured by different devices with different optical density or DPI), $\epsilon_{dist}$ is an absolute matching accuracy in pixels (that depends, for example, on the tolerance of skin deformation at enrollment and query), $$\epsilon'_{dist}$$

is a relative matching accuracy, and $\epsilon_{ang}$ is an absolute angular accuracy as a multiple of $2\pi/n_\theta$ (for example, 0 or 1). Function f of minutia types (in this example) and, optionally, other local parameters in (7), may be a collisionful (i.e., irreversible) hash function. Although this transformation guarantees irreversibility, it also increases the number of false matches given the larger sizes (n(n−1)/2 and m(m−1)/2) of the transformed datasets (8) and (9). Equations (10) through (12) represent similarity criteria for the different elements of the transformed templates; a scoring function can be based on tabulating the number of similar entries or the number of similar elements between the transformed enrolled and transformed query templates.

As discussed above, embodiments of this disclosure verify a biometric based on measuring similarity using transformed templates of input biometric data such as (8,9). Because verification can be performed using transformed templates, this eliminates the need to store the original templates of the biometric data, reducing the risk that these original templates could be discovered and used to reverse-engineer a user's biometric data. For instance, example feature transformation (8) essentially discards local information of minutiae position and orientation in lieu of relative position and orientation, improving irreversibility. Particular embodiments can represent the resulting transformed template as a linear array of quadruples, sorted (for example) by $r_i$ and optionally subsampled:

$$T = \{e_k, \ldots\},\ e_k = \left(r_k, \phi_k, \tau_k^1, \tau_k^2\right),\ 1 \le k \le M \le \frac{n(n-1)}{2}. \tag{13}$$

Recovering the original minutiae coordinates $x_i$, $y_i$ of template (6) from the distances or weights $r_{ij}$ in (8) is a polynomially complex computational problem. The disassociation between the edges and nodes as in (13) results in a (much higher) non-polynomial complexity of the resulting search algorithm, even before one considers the requirements of matching the angles (11) and collisionful hashes (12) of the minutia types and optional parameters. Equation (13) shows how particular embodiments list the relative distances captured in the transformed template without referring to the original minutiae indices. This "anonymization" makes it impossible in practice to recover the original minutiae coordinates from the list of transformed values $\{e_k\}$, much as it would be impossible to pinpoint cities on a map if one were only given a list of unlabeled pairwise distances between them. The difference between equations (8) and (13) is that the latter corresponds to an unlabeled list, one of the reasons that reverse engineering becomes intractable.

For any pair of transformed templates ($\tau_0$, $\tau$), one of which is a transformed enrollment template $\tau_0$ and the other is a transformed query template $\tau$, a similarity score S between the two transformed templates may be represented as:

$$S(\tau_0, \tau, \lambda_F, \xi_F, \lambda_S, \xi_S) = S_C(\tau_0, \tau(\lambda_F, \xi_F), \lambda_S, \xi_S), \tag{14}$$

where $S_C$ is a scalar or vector function of the templates, of a latent scoring variable vector $\lambda_S$, and of an explicit scoring parameter vector $\xi_S$. Here, $\lambda_F$ and $\xi_F$ represent optional latent transformation variables and explicit transformation variables, respectively, e.g., in order to model random effects in the transformation function. As illustrated in the example of FIG. 2, $\lambda_F$ and $\xi_F$ may be generated in step 4, before the transformation of template t occurs in step 5. The function $S_C$ is computable at run time and can be either expressed in a closed form (e.g., equation (15) below) or defined algorithmically, and may be either a deterministic function or a stochastic random process. In the latter case $\lambda_S$ can be, for example, a random variable. Score values (14) are functions of not only the templates but of both latent variable vectors $\lambda_F$, $\lambda_S$ (the former through the transformation (1) while the latter through $S_C$), and likewise functions of both explicit parameter vectors $\xi_F$, $\xi_S$. For example, for transformed fingerprint templates (9) and (13) discussed above, $\lambda_S$ can be a measure of distortion (e.g., skin deformation) at image capture and $\lambda_F$ null, while $\xi_S$ can be a vector of the number of minutiae (i.e., n in (8,13)) and the known ratio of optical densities of two fingerprint scanners (i.e., $\delta$ in (10)). Similarly, $\xi_F$ can be the tolerance $\epsilon_{dist}$ in (10). In particular embodiments, explicit parameters may include a number of entries selected from each of the transformed query template and the transformed enrollment template; an imaging resolution of a sensor used to capture the query biometric data or the enrollment biometric data; a measure of distortion of a biometric based on at least one of prior information or sensor input; or a context associated with a biometric, such as a user characteristic (e.g., a height, gender, or other anatomical characteristic) and/or one or more environmental conditions that impacts the capture, transformation, or storage of the biometric data. In general, explicit parameters include quantitative parameters that are either directly measurable or can be estimated from prior information, while latent parameters include parameters for which quantitative estimates are not available. Latent parameters may include, for example, a variance in each of one or more spatial coordinates of distinct biometric features measured in the query biometric data; a variance in each of one or more angular coordinates of the distinct biometric features measured in the query biometric data; an amount of noise in an output of a sensor used to measure the query biometric data; on an imaging resolution of a sensor used to capture the query biometric data or the enrollment biometric data (i.e., when such resolution is not known).

In the example implementation of FIG. 2, score(s) (14) are computed in step 6. Through the transformed templates $\tau_0$, $\tau$, score (14) implicitly depends on a Boolean latent variable that is denoted as a that indicates templates arising from matching biometrics ($\alpha$=1) or non-matching biometrics ($\alpha$=0).

Particular embodiments use a scoring function to determine a similarity score S, a measure of similarity, between an enrolled template $T_{enrol}$ and a query template $T_{query}$ as the number of quadruplets of the query template that satisfy the matching conditions (10) or (10'), 11, 12) with respect to the enrolled template (13) divided by the smaller cardinality of the two transformed templates:

$$S(T_{enrol}, T_{query}, \delta, \epsilon_{dist}, \epsilon_{ang}) = \frac{\left|\left\{(k, l)\colon \exists\, i,\ 1 \le i \le M \,|r_i - \delta r'_{kl}| \le \epsilon_{dist} \wedge |\phi_i - \phi'_{kl}| \le \epsilon_{ang} \wedge f\left(\tau_i^1, \tau_i^2, \ldots\right) = f(\tau'_k, \tau'_l, \ldots)\right\}\right|}{\min(|T_{enrol}|, |T_{query}|)} \tag{15}$$

In the left-hand side of (15), $\delta$, $\epsilon_{dist}$, $\epsilon_{ang}$ are parameters governing scaling and tolerance. The scoring function (15) additionally depends on parameters such as the actual resolution-dependent scaling of the captured fingerprint images (as determined by sensor hardware and processing software), and the amount of actual skin deformation on contact. In particular embodiments, a scoring function may depend on other variables that may be independent of biometric capture and may be, for example, generated randomly at run time. Vertical bars in (15) denote the cardinality (the number of elements) of a set.

More generally, particular embodiments that use the approach in equations (3,4) may use a scoring function defined by:

$$S(T_1, T_2, \epsilon_{dist}, \theta_C) = \frac{\left|\left\{j \in 1, \ldots, \frac{m(m-1)}{2} : \exists\, i, 1 \le i \le M\ dist(r_i, r'_j, \theta_C) \le \epsilon_{dist} \wedge |\phi_i - \phi'_j| \le \epsilon_{ang} \wedge f(\tau_i'^1, \tau_j'^2, \ldots) = f(\tau_i^1, \tau_i^2, \ldots)\right\}\right|}{(\min(|T_{enrol}|, |T_{query}|))} \tag{16}$$

where $$dist(r_i, r'_j, \theta_f)$$

is a transformation-specific parameterized measure of similarity between two elements of biometric references (transformed templates)

$$T_{query} = \{r'_j\}_{j=1}^{\frac{m(m-1)}{2}},$$

$\epsilon_{dist}$ is a tolerance parameter, and $\theta_C$ are parameters used to define the scoring function from e.g. a function ansatz—see (41). The score (16) can be interpreted as counting the fraction of similar pairs of features between the two templates while ensuring similarity of other attributes (types, relative orientations, etc.), and is a generalization of comparing lengths or weights of line segments connecting pairs of minutiae as discussed above. Moreover, while the example discussed above and herein often refer to fingerprints as a biometric and minutiae as the distinctive biometric features, this disclosure contemplates that the techniques described herein may be applied to any suitable biometric and biometric features.

In the example method of FIG. 1, step 140 includes determining multiple similarity scores for two transformed templates, with each similarity score being based on a different value of a scoring parameter. For example, a scoring parameter may be a perturbation or deformation metric e that describes some variation between biometric samples. For example, when acquiring a fingerprint, user force on the fingerprint sensor may cause skin deformation, which results in fingerprint-feature deformation, and the amount of deformation depends on the force with which the user pushes down into the sensor. This amount of force is generally not known, and therefore the amount of deformation in the resulting biometric data is generally not known. However, different amounts of deformation will change templates values and transformed templates values (e.g., will change the relative distance metrics between biometric features), and therefore e can be used to represent the perturbation or deformation of these features. As another example of scoring parameters, some minutiae will likely not be detected by a given sensor in any particular instance, and therefore the number of minutiae available to sample from may vary. More generally, scoring parameters may include explicit parameters (e.g., $\xi_S$, of which the number of sampled elements is one example), may include latent parameters (e.g., $\lambda_S$, of which e is one example), or both.

As described below, a decision about whether to approve a verification request is based on determining whether a query biometric is in fact the same as the enrollment biometric (e.g., whether a presented fingerprint is in fact the same fingerprint that was presented during enrollment). In a typical approach, whether a query biometric matches an enrollment biometric is based on whether the percent match of distinctive features in the two respective templates meets a predetermined threshold percentage. However, as explained above, the percentage of matching of distinctive features may vary based on variables that do not reflect whether the biometric is in fact the same, such as the number of features sampled in the comparison, or an amount of perturbation between the enrollment and query biometric. As a result, variation in these variables may ultimately affect a determination of whether a query biometric matches the enrollment biometric in any given instance, particularly when a fixed threshold (e.g., percent of matching features) is used to make this determination. As a result, legitimate verification attempts may be denied and illegitimate verification attempts may be permitted due to variance in such variables. However, step 140 includes determining multiple similarity scores, with each score associated with a different value of a scoring parameter. As explained below, this approach can be used to reduce the effect of variable variance on a matching decision, resulting in more accurate verification determinations. Moreover, because the effect of variable variance on determination outcomes tends to be more pronounced as the transformation used becomes more irreversible, the techniques described herein allow for the use of relatively more irreversible transformations while maintaining high verification accuracy, which protects user privacy and data security.

While some embodiments of this disclosure, such as the example method of FIG. 1, include determining multiple similarity scores when evaluating a verification request, this disclosure contemplates that particular embodiments may determine a single similarity score (e.g., based on the matching percentage of distinctive features) when evaluating a verification request. For example, particular embodiments may use the transformation described in (8) to create transformed templates, and may evaluate a verification request using such transformed templates based on a single similarity score (as determined, e.g., based on one or more of conditions (10)-(12)).

Step 150 of the example method of FIG. 1 includes determining, based on the plurality of determined similarity scores, whether to grant or deny the verification request. For instance, in the context of scoring function (14), particular embodiments may gather latent variables $\lambda_F$, $\lambda_S$ into a single latent variable $\lambda$ and explicit parameters $\xi_F$, $\xi_S$ into parameter $\xi$, and treat scores (14) as statistically distributed according to a conditional probability distribution.

$$S \sim p_S(S = s \mid \lambda, \xi, \alpha) \tag{17}$$

As explained more fully below, in particular embodiments domain-specific scoring functions $S_C$ can be generated automatically using statistical inference and optimization. For example, (14) can be given by a generative operator such as a feed-forward neural network with weights determined to statistically increase the discriminative power of posterior probability inference from (17).

Particular embodiments may estimate the conditional probability distribution (17) prior to verification (e.g., prior to the performance of the example method of FIG. 1 or the example approach of FIG. 2) by evaluating similarity scores (14) for sampled pairs of transformed templates for a range of variables $\lambda$, $\xi$, and $\alpha$. The distribution may be based on synthetic templates, real templates, or a combination therefore. Prior to deployment, embodiments empirically estimate the conditional probability distribution of observed scores for the given template transformation (1) and likeness score (17). For example, particular embodiments may fit a parameterized or non-parameterized distribution $p_S(S=s|\lambda, \xi, \alpha)$ to the resulting dataset of observed scores. For example, particular embodiments assume a specific parameterized form, such as Gaussian distribution for (17):

$$p_S(S = s \mid \lambda, \xi, \alpha) = \mathcal{N}(s \mid \mu[\lambda, \xi, \alpha]; \sigma^2[\lambda, \xi, \alpha]), \tag{18}$$

and estimate the mean and variance parameters $\mu[\lambda, \xi, \alpha]$. $\sigma^2[\lambda, \xi, \alpha]$ from the observed scores for labeled biometric data ("training data"). Alternatively, particular embodiments may approximate (17) from the observed scores using any desirable ansatz forms or algorithmic models for $p_S$ including mixture models, neural networks, lookup tables, discriminant manifolds and other models that could encode arbitrary multimodal probability distributions and allow subsequent evaluation of observed score probabilities at run time. The training data may be comprised of multiple biometric templates (representing repeated captures of the same biometric under different conditions) from multiple individuals. The publicly shared biometric database of the United States National Institute of Standards (NIST) are examples of such training data. Where the quantity or quality of the available training data are deemed inadequate for estimating the score distribution (18) (or its non-Gaussian alternatives), synthetic biometric data may be used in particular embodiments to expand, replace, or enhance the available data from individuals, as discussed in more detail below. Once a computable distribution (17) is determined, particular embodiments conduct inference of the posterior probability of match or no match from the set of likeness scores $\tilde{S}=\{\tilde{S}_i, i=1, \ldots, N_S\}$ computed at run time, $$p(\alpha, \lambda \mid \xi, \tilde{S}) \propto p(\tilde{S} \mid \lambda, \xi, \alpha), \tag{19}$$

and marginalize out the latent variable $\lambda$ to obtain the match probability $p_{match}(\alpha)$. The example implementation of FIG. 2 illustrates this process in step 7. Inference (19) may be conducted iteratively as in (20), with each posterior match probability serving as the next iteration's prior, $$p_i(\alpha, \lambda) = p(\alpha, \lambda \mid \xi_i, \tilde{S}_i) \propto p(\tilde{S}_i \mid \lambda, \xi_i, \alpha) p_{i-1}(\alpha, \lambda), \; i = 1, \ldots, N_S, \tag{20}$$

where $p_0(\alpha, \lambda)$ can be a trivial non-informative prior, and $\xi_i$, $\tilde{S}_i$, $i=1, \ldots, N_S$ are explicit parameters and the corresponding likeness scores for a fixed pair of transformed templates $\tau_0$, $\tau$ and fixed $\lambda$. The latter will remain fixed per enquiry if the similarity measure (14) defines deterministic scores.

Once the match probability $p_{match}(\alpha)$ is determined, then a verification process can use the match probability to determine whether to allow the verification request, deny the verification request, or continue the verification process. For example, step 8 of the example implementation of FIG. 2 illustrates a match condition $|p_m(1)-p_m(0)|>z$ that determines whether to output a result (allow or deny) of the verification request or whether to continue the verification process. In step 8 of the example of FIG. 2, the match condition essentially resolves the verification process when the probability of a biometric match ($p_m(1)$) or of a not-match ($p_m(0)$) is relatively certain, i.e., the difference between the two outcomes is greater than a tolerance value z. In particular embodiments, a match condition may simply be whether the one of the two probabilities is greater than 50%. As illustrated in the example of FIG. 2, in particular embodiments, if a match condition is not satisfied, then a verification process may attempt to acquire more query data in order to increase the certainty of the match/no-match determination. In the example of FIG. 2, if the match condition in step 8 is not satisfied, then the process in step 9 determines whether the verification process has made too many attempts to determine the outcome. If yes, then in the example of FIG. 2, the final match condition $\alpha^*$ is set to 0 (i.e., the verification request will be denied) in step 11, and the result is output in step 13 (i.e., the verification request is denied, resulting in completion of the process in step 14). In particular embodiments, the number of attempts to allow may be based on an amount of time that has elapsed during the verification process, or may be a number, e.g., as set by a user or by an administrator or by the system.

In the example of FIG. 2, if the maximum number of attempts has not been exceeded in step 9, then the process may acquire a new template T (and therefore a transformed template $\tau$) and repeat inference (32), starting with a new prior (step 10 in FIG. 2), $$p_0(\alpha, \lambda) \propto p_{match}(\alpha), \tag{21}$$

that is uninformative with respect to $\lambda$ but allows cumulative inference of match probability with respect to multiple queries of the same biometric. If a match condition is satisfied, then the most likely match result (i.e., match or no match) may be output, as illustrated in step 12 of the example of FIG. 2, in which the final match determination $\alpha^*$ is set to the value associated with the most likely verification outcome, as determined by the process. This final match determination is output in step 13 (in the example here, if $\alpha^*=1$ then the verification request will be granted, and if $\alpha^*=0$ then the request will be denied), and the process ends in step 14.

Perturbations to biometric data can include transformations such as one or more of rotation, translations, scaling, and non-uniform nonlinear image deformation (e.g., non-uniform stretching of skin) or non-uniform non-linear attribute corruption (e.g., color, brightness, contrast changes). Adequate characterization of score distribution (18) or a similar parametric or non-parametric probability distribution may depend on the availability of training data that faithfully conveys variability of biometric templates captured in realistic settings. Where quantity or quality of the available biometric training data lacks the required quantity and variety, in particular embodiments additional training data can be generated by either transforming existing biometric signatures or templates or generating fully synthetic biometric templates based on anatomical models relevant to specific biometric applications. To generate synthetic pairs (i.e., an enrollment template and a perturbed query template), particular embodiments may randomly perturb distinctive features (e.g., minutia) using one or more transformations. Here, $\epsilon$ may represent a perturbation standard deviation of the feature coordinates, e.g., pixels (i.e. so that for $\epsilon=1$ means a standard deviation of 1 pixel in the amount of perturbation randomly applied to features). In particular embodiments, generating a synthetic dataset may include eliminating a small fraction of features in the transformed template (e.g., similar to how a sensor may miss some features in a biometric).

In embodiments that use the example scoring function (15), score values are distributed according to an unknown probability distribution $$S \sim p_S(S = s \mid \epsilon, \delta, \epsilon_{dist}, n, m, \alpha) \quad (22)$$

conditioned on variables $\epsilon$ (for example, the standard deviation of minutia coordinate deformation at the query), tolerance parameter $\epsilon_{dist}$, $\delta$ (device-dependent constant scaling), and $\alpha$ (equal to 1 if the templates come from the same finger, 0 otherwise). n, m are the numbers of minutiae in the untransformed enrollment and query fingerprint templates. However, the distribution in (22) can be equivalently parameterized by the numbers of pairs of minutiac, n(n−1)/2, m (m−1)/2. In essence, Eq. (22) represents two score probability distributions: one distribution for matching fingerprints ($\alpha$=1) and one for non-matching fingerprints ($\alpha$=0). The overlap of these distributions will determine the EER. While the discussion in this examples uses fingerprints and minutia as examples, this disclosure is not limited to those examples.

Figure 3:
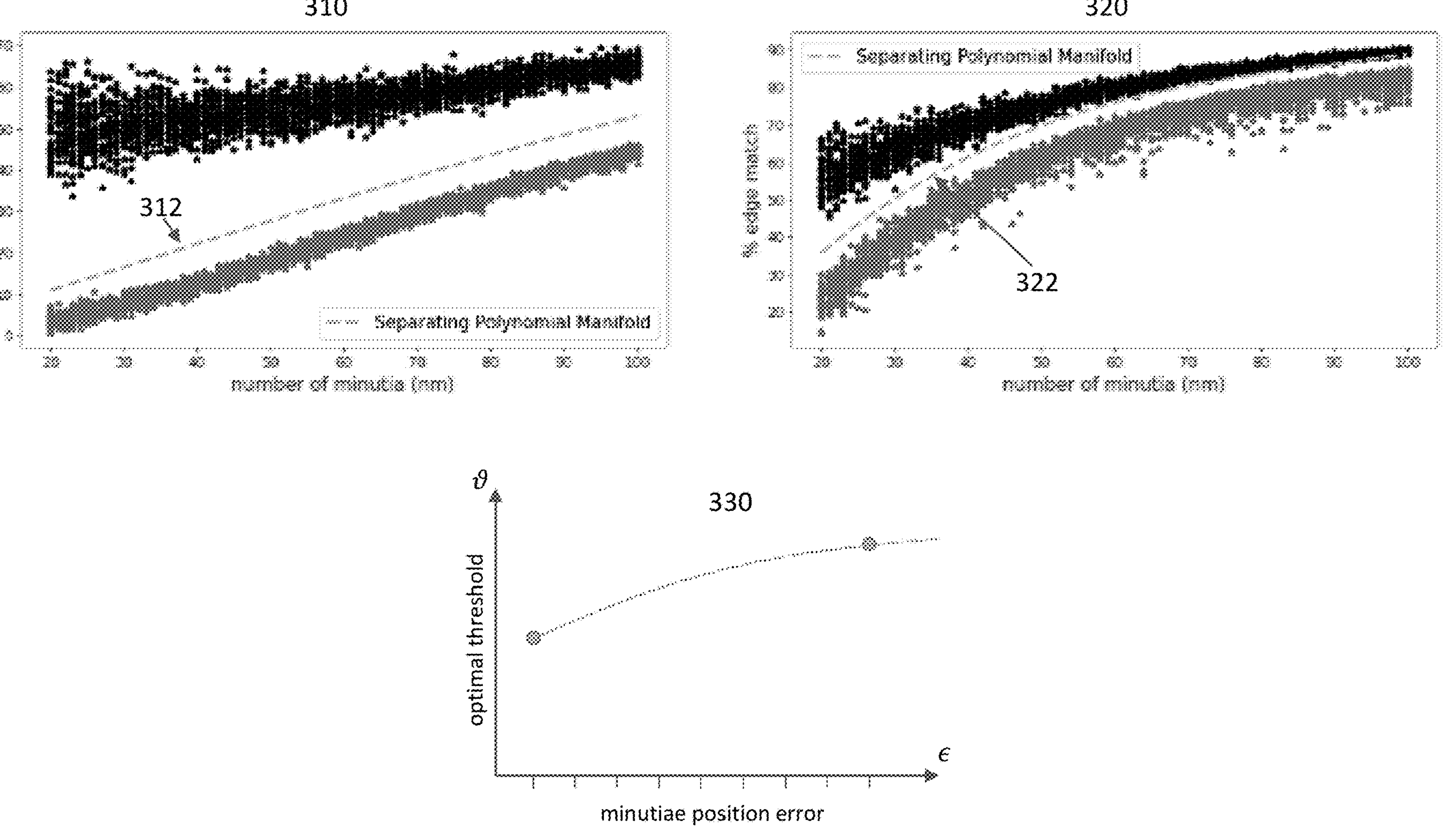
FIG. 3 illustrates two examples of variable-dependent distributions using synthetic fingerprint data.

To estimate probability distribution (22), particular embodiments evaluate (15) for pairs of perturbed real or synthetic templates when $\alpha$=1. Here, actual angular deformation and angular tolerance fang are assumed constant and equal to one $2\pi/n_\theta$sector, although in particular embodiments, individual feature angles $\theta_i$ may b randomly perturbed corresponding to rotations not exceeding the sector size $2\pi/n_\theta$. In this example, n=m—that is, both templates have the same number of minutiae, and no decimation is applied to either one of the templates being scored; however, this approach applies when n≠m as well, with individual score samples evaluated for pairs of templates with partially overlapping or non-overlapping sets of minutiae or other distinctive features. For the conditional probability when $\alpha$=0, particular embodiments evaluate (15) for two randomly generated minutia templates comprising the same number of minutiae. FIG. 3 plots the resulting random scores vs n=m for $\epsilon=\epsilon_{dist}=1$ and $\epsilon=\epsilon_{dist}=9$. Here it can be assumed that $\delta$=1, as is the case for the NIST datasets of non-latent fingerprint images.

FIG. 3 illustrates two examples of variable-dependent distributions using the synthetic data described above. Graph 310 illustrates an example in which $\epsilon=\epsilon_{dist}=1$ and graph 320 illustrates an example in which $\epsilon=\epsilon_{dist}=9$. In each graph, the y axis corresponds to the percentage of matching transformed template elements, and the x axis corresponds to the number of sampled minutia. In graph 310, line 312 (a separating polynomial manifold, as described more fully below) separates data points that correspond to matching enrollment and perturbed query templates from data points that correspond to non-matching enrollment and perturbed query templates. In graph 320, line 322 separates data points that correspond to matching enrollment and perturbed data points from data points that correspond to non-matching enrollment and perturbed query templates. Each graph illustrates two distributions for given parameter values: e.g., in graph 310 there is a distribution $\alpha$=1 above line 312, and a distribution $\alpha$=0 below line 312.

As illustrated in the example of FIG. 3, the particular values separating matching and non-matching templates pairs varies both on the value of $\epsilon$ and on the number of minutiae sampled. This illustrates a specific example of the general case discussed above, i.e., that in practice, any particular determination of whether enrollment biometric matches a query biometric will depend on variables unrelated to whether the two biometrics actually match. Using a fixed threshold to determine whether to allow a verification request will result in less reliable determinations. For instance, in the example of FIG. 3, if the number of minutiae used is 50, then an optimal threshold value for instances in which $\epsilon$=1 may be 28% (i.e., if the percentage match between elements in the transformed enrollment template and the transformed query templates is greater than 28%, then the fingerprints are determined to match). However, if this value is used in instances that correspond to $\epsilon$=9 (e.g., a user is smushing their finger unusually hard against the sensor or has unusually deformable skin), then all or most non-matching pairs of prints would be incorrectly treated as matching. In contrast, if the more demanding curve 322 of optimal values for the instance of graph 320 is used for instances illustrated by graph 310, then many valid verification attempts (e.g., where the enrollment and query prints match) would be incorrectly rejected.

Using data distributions determined prior to runtime, particular embodiments may determine optimal values for a threshold that separates match/no-match ($\alpha$=1 and $\alpha$=0) determinations. As illustrated in FIG. 3, these optimal values may vary based on the value of scoring parameters, such as the number of minutiac sampled and/or $\epsilon$. For example, graph 330 in the example of FIG. 3 illustrates optimal threshold values 332 as a function of $\epsilon$ for a fixed number of sampled minutiae. As explained below, these optimal values may be subsequently used during runtime to determine whether a particular similarity score corresponds to a match or no-match condition, given the value(s) of the scoring parameter(s) used. As explained below, the ultimate verification determination may be based on these separate match/no-match determinations.

In particular embodiments, a conditional distribution (22), once determined, can be captured or represented empirically or assumed to be in a parametric form—for example, of a Gaussian distribution:

$$p_S(S = s \mid \epsilon, \delta, \epsilon_{dist}, n, m, \alpha) = \mathcal{N}\left(s \mid \mu[\epsilon, \delta, \epsilon_{dist}, n, m, \alpha]; \sigma^2[\epsilon, \delta, \epsilon_{dist}, n, m, \alpha]\right) \quad (23)$$

where the mean and the variance depend on the conditioning parameters. Unbiased estimates of the mean and variance can be obtained as:

$$\mu[\epsilon, \delta, \epsilon_{dist}, n, m, \alpha] = \hat{\mu} = \sum_{i=1,\ldots,N} \frac{S_i}{N}, \quad (24)$$

$$\sigma^2[\epsilon, \delta, \epsilon_{dist}, n, m, \alpha] = \sum\nolimits_{i=1,\ldots,N} (S_i - \hat{\mu})^2/(N-1),$$

where $S_1, \ldots, S_N$ are the scores (15) computed with given $\epsilon_{dist}$ for N pairs of matching (if $\alpha$=1) or non-matching (if $\alpha$=0) random templates generated (from scratch or from real templates) for given values of $\epsilon$, $\delta$, n, m. As discussed throughout, score (15) is computed from the transformed templates for each fingerprint pair. In this example, both $\mu$ and $\sigma$ will be functions of $\epsilon$, the standard deviation of minutiae coordinates in the query dataset.

While a single query provides a single score given assumed scoring-parameter values (e.g., $\epsilon$ values), multiple successive queries (e.g., step 10 of the example implementation of FIG. 2) will yield a distribution of scores that can be characterized by mean $\mu$ and variance $\sigma^2$. Particular embodiments measure $\mu(\epsilon)$ and $\sigma(\epsilon)$ in an initial learning stage, and therefore during runtime can improve the ultimate estimation of $\alpha$ (i.e., improved the ultimate verification determination in step 150 of the example method of FIG. 1) by comparing the distribution of scores from successive queries to that which would be expected. In other words, successive queries originating from a common biometric signature can be applied cumulatively so that additional samples may enhance the accuracy of matching inference when the outcome from a smaller set of queries is uncertain.

Continuing the example above, conditional probabilities (23) are determined or estimated for a range of relevant parameters (e.g., $\epsilon$, $\delta$, $\epsilon_{dist}$, n, m) for both values of $\alpha$, and these are stored for subsequent use during run time. At run time, particular embodiments determine the matching scores $\tilde{S}$ for a transformed enrolled template (which may be stored on the device used for verification or on another device) and the transformed query template, for example as explained in connection with step 140. Step 150 then involves estimating the posterior probability of a match ($\alpha$=1) or mismatch ($\alpha$=0) by estimating the posterior probability:

$$p(\alpha \mid \epsilon, \delta, \epsilon_{dist}, n, m, \tilde{S}) \tag{25}$$

which can be estimating using the Bayesian rule $$p(\alpha \mid \epsilon, \delta, \epsilon_{dist}, n, m, \tilde{S}) = \frac{p_S(S = \tilde{S} \mid \epsilon, \delta, \epsilon_{dist}, n, m, \alpha) p(\epsilon, \delta, \epsilon_{dist}, n, m, \alpha)}{p(\epsilon, \delta, \epsilon_{dist}, n, m, \tilde{S})} \tag{26}$$

Note that values $\delta$, $\epsilon_{dist}$, n, m are uniquely associated with the given value of $\tilde{S}$: $\delta$ and $\epsilon_{dist}$ are user-specified parameters in (15), and n, m are the known numbers of the minutiae in the enrolled and query templates before template transformations (8,13). For the joint probability $p(\epsilon, \delta, \epsilon_{dist}, n, m, \alpha)$:

$$p(\epsilon, \delta, \epsilon_{dist}, n, m, \alpha) = p(\epsilon, \delta, \epsilon_{dist}, n, m) p(\alpha) \tag{27}$$

because the marginal probability of match $p(\alpha)$ is independent of the other parameters. For the posterior (26) there can be:

$$p(\alpha \mid \epsilon, \delta, \epsilon_{dist}, n, m, \tilde{S}) \propto p_S(S = \tilde{S} \mid \epsilon, \delta, \epsilon_{dist}, n, m, \alpha) p(\alpha), \tag{28}$$

which discards any terms in (26) that are independent of $\alpha$, because their effect can be incorporated by normalizing (28) as a distribution in $\alpha$. While $\delta$, $\epsilon_{dist}$, n, m are known when $\tilde{S}$ is evaluated, parameter e that represents the standard deviation of the original minutia location perturbations is an inherently latent parameter and requires estimation or marginalization. Denoting the former explicit parameters associated with scores $\tilde{S}_1, \ldots, \tilde{S}_{M_S}$ as $$\xi_i = (\delta_i, \epsilon^i_{dist}, n, m_i),$$

i=1, . . . , $N_S$ and introduce a latent vector $\lambda=(\epsilon, \ldots, )$ where the dots may represent additional latent parameters then (28) can be used to iteratively improve the posterior probability $p(\alpha \mid \lambda, \xi_i, \tilde{S}_i)$:

$$p_0(\alpha \mid \lambda) \equiv .5,$$
$$p_i(\alpha \mid \lambda) = p(\alpha \mid \lambda, \xi_i, \tilde{S}_i) \propto p(\tilde{S}_i \mid \lambda, \xi_i, \alpha) p_{i-1}(\alpha \mid \lambda), \; i = 1, \ldots, N_S \tag{29}$$

where $p_i(\alpha \mid \lambda)$ is the probability of a match given multiple score samples from the same finger. Dependence on latent $\lambda$ simply means that iterations (29) are conducted for a range of values of $\lambda$. For instance, in the example discussed above $\lambda=\epsilon$ and $\epsilon$ can range from 1 to 9 pixels. Given some prior $p(\lambda)$ (e.g., prior knowledge that 2-pixel deformations are more common than 1 and 5-pixel ones), particular embodiments estimate the final probability of a match between an enrollment biometric and a query biometric as:

$$p_{match}(\alpha) = \int_{\lambda \in \Lambda} p_{N_S}(\alpha \mid \lambda) p(\lambda) d\lambda, \tag{30}$$

where $\Lambda$ is the range of relevant values of the latent variable. Particular embodiments may use:

$$p_{match}(\alpha) \approx p_{N_S}(\alpha \mid \lambda_*), \; \lambda_* = \operatorname{argmax} p(\lambda), \tag{31}$$

where $\lambda_*$ is the vector of highest-likelihood values of latent variables. Particular embodiments may determine $p_{match}(\alpha)$ by taking a weighted sum of the individual probabilities of a match, where each individual probability is determined by evaluating the score vs. scoring threshold for the adopted value(s) of the scoring parameter(s) for a particular enrollment-query pair. Each probability maybe weighted by the probability of the particular value(s) of the scoring parameter(s) adopted for that scoring determination. For example, for the scoring parameter $\epsilon$ described above, particular embodiments may adopt a probability distribution that is proportional to $1/\epsilon$.

Multiple scores in (29) may represent multiple query attempts as well as multiple score evaluations (15) e.g., for different values of the tolerance parameter $\epsilon_{dist} \in \xi_i$. Conditional probabilities $p(\tilde{S}_i \mid \lambda, \xi_i, \alpha)$ in (29) may be given by precomputed probability distributions (22) that can be Gaussians (23) defined by their parameterized mean and variance (24). Such means and variances can be stored in a lookup table or approximated as polynomial functions of the parameters. Alternatively, particular embodiments can introduce a discriminant manifold $D[\epsilon, \delta, \epsilon_{dist}, n, m]$ so that $$p(\tilde{S}_i \mid \epsilon, \delta, \epsilon_{dist}, n, m, \alpha = 1) \approx L(\tilde{S}_i - D[\epsilon, \delta, \epsilon_{dist}, n, m]), \tag{32}$$

$$L(x) \text{ is logistic function, e.g., } \frac{1}{1 + e^{-cx}}, \; c \equiv const > 0,$$

and the discriminant manifold is Mahalanobis equidistant from the means of matching and nonmatching scores. Equation (33) is:

$$D[\epsilon, \delta, \epsilon_{dist}, n, m] = \frac{(\mu[\epsilon, \delta, \epsilon_{dist}, n, m, \alpha = 0]\sigma[\epsilon, \delta, \epsilon_{dist}, n, m, \alpha = 1] + \mu[\epsilon, \delta, \epsilon_{dist}, n, m, \alpha = 1]\sigma[\epsilon, \delta, \epsilon_{dist}, n, m, \alpha 0]}{\sigma[\epsilon, \delta, \epsilon_{dist}, n, m, \alpha = 0] + \sigma[\epsilon, \delta, \epsilon_{dist}, n, m, \alpha = 1]} \tag{33}$$

In the absence of a credible p(λ) in (30) or a simplifying assumption for the maximum likelihood λ, such as in (31), particular embodiments may either estimate the latent vector along with α, or approximate p(λ). In the former approach, particular embodiments replace (29) with iterations $$p_0(\alpha, \lambda) \equiv .5p_0, (\lambda),\ p_i(\alpha, \lambda) = p(\alpha, \lambda \mid \xi_i, \tilde{S}_i) \propto p(\tilde{S}_i \mid \lambda, \xi_i, \alpha)p_{i-1}(\alpha, \lambda),\quad i = 1, \ldots, N_S, \tag{34}$$

where the first equation in (34) is equivalent to the first equation in (29) and represents the fact that in the absence of observations that depend on both α and λ, the two random variables are independent. Note that notation $p_i(\alpha, \lambda)$ is shorthand for the joint distribution of α, λ conditioned on a score value (15) that is dependent on both α and λ. This situation illustrates the phenomenon of explaining away when an observation that is dependent on two otherwise independent random variables make them conditionally dependent. Therefore, the posterior distribution $p_i(\alpha, \lambda)$=p (α, λ51 $\xi_i$, $\tilde{S}_i$) may not factorize and will have to be encoded as a joint distribution in implementations. In the example of a fingerprint template discussed above, (34) requires updating an array of 18 floating-point numbers (for ϵ=1, . . . , 9 pixels, α=0,1). The match probability (30) can now be evaluated as $$P_{match}(\alpha) = \int_{\lambda \in \Lambda} p_{N_S}(\alpha, \lambda) d\lambda \tag{35}$$

Another approach is to conduct (29) then substitute p(λ) in (30) with a proposal distribution q(λ) as in approximate inference, $$P_{match}(\alpha) \approx \int_{\lambda \in \Lambda} p_{N_S}(\alpha \mid \lambda) q(\lambda) d\lambda, \tag{36}$$

where q(λ) can be based on sensor inputs such as the quality of the raw fingerprint image (e.g., blurriness may partially quantify the uncertainty of the minutia coordinates) and other data external to the system, such as data from a pressure sensor that measures the force with which the fingerprint was imaged.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including steps of the example method illustrated in FIG. 1, may be performed by circuitry of a computing device described herein, by a processor coupled to non-transitory computer readable storage media, or any suitable combination thereof.

The following discussion provides examples of implementation and performance of the example method of FIG. 1. Whether directly using a parameterized representation of learned conditional probabilities as in (23,24) or utilizing a discriminant manifold (33) with a sigmoid or similar function (32), the iterative inference (29) relies on precomputed functions of multiple parameters, such as equations (24) and (33). Such precomputed functions can be encoded and stored on a computing device (such as the device that performs biometric verification) using a variety of methodologies that reduce the dimensionality of the relevant data structures. For example, the discriminant manifold (33) 322 of graph 320 of FIG. 3 is accurately approximated using a $3^{rd}$-degree polynomial fitting, thus reducing the storage requirement from (100–20)*9=720 floating point numbers per single value of the latent parameter ϵ down to 4*9=36, $$D[\epsilon, \delta = 1, \epsilon_{dist}, n, n] \approx \sum_{i=0}^{3} c_i(\epsilon, \epsilon_{dist}) n^{3-i}, \tag{37}$$

The original size of 720 floats comes from n=m allowed to be in the range of 40 to 119 minutia and the tolerance $\epsilon_{dist}$ ranging from 1 to 9 pixels. Note the reduction is even more significant if n≠m when two-dimensional polynomial fitting may be applied, $$D[\epsilon, \delta = 1, \epsilon_{dist}, n, m] \approx \sum_{i,j=0}^{3} c_{ij}(\epsilon, \epsilon_{dist}) n^{3-i} m^{3-j}, \tag{38}$$

requiring 9*16=144 floating-point numbers per value of ϵ down from 80*80*9=57600 required to store the full manifold (33). Particular embodiments may use implementations based on the statistical model (23,24) and inference (29-33) that utilizes representation (37) or (38). Note the estimation of distribution parameters in (24) that precedes implementation of the runtime algorithm on the system is a parameter estimation problem for estimating the mean and variance μ[ϵ, δ, $\epsilon_{dist}$, n, m, α], $\sigma^2$[ϵ, δ, $\epsilon_{dist}$, n, m, α]. An alternative implementation may utilize a non-factorized conjugate prior, for example a Gaussian-gamma distribution, that may capture such dependence and retain its functional form in the posterior distribution, potentially adding an accuracy-improving constraint.

Repetitive evaluation of the scoring function (15) for pairs of enrolled and query transformed templates (according to equations 9 and 13) provides an efficient implementation on small-scale computing platforms such as embedded micro-controller systems as, for example, illustrated by the following algorithm:

Algorithm 1. A similarity score evaluation for transformed templates (13) and (9) using (15).

1. The enrolled transformed template (13) is retrieved from a long-term memory as an array $T_{enrol} = (r_i, \phi_i, f(\tau_i^1, \tau_i^2, \ldots))$, $i = 1, \ldots, n(n-1)/2$, where $r_i$ are numerically sorted, and f is a hash function of minutia types and optional local parameters - see (12). Here, f allows comparison of unordered pairs of two binary numbers $\tau_1, \tau_2$, $$f(\tau_1, \tau_2) = \min(\tau_1, \tau_2) + 2\max(\tau_1, \tau_2). \quad (39)$$

2. A query template is captured and transformed $T_{query} = (r'_{ij}, \phi'_{ij}, \tau'_i, \tau'_j)$, $1 \le i < j \le m$ as in (9). Particular embodiments may use an optional QC (quality control) step to identify and eliminate template artifacts (e.g., misidentified minutiae) that significantly impact the statistical distribution of distances or weights. If the system's minutia extraction supports confidence ranking of the extracted minutiae, multiple query templates may be used to produce multiple scores with variable degrees of confidence.
3. Assign S = 0 (separately for each transformed input query template for multiple inputs)
4. For k = 1, . . . , m − 1
5. For l = k + 1, . . . , m
6. Find i such that $r_i$ is closest to $\delta r'_{kl}$ in the sorted array $\{r_i\}$ (e.g., using binary search).
7. If $|r_i - \delta r'_{kl}| \le \epsilon_{dist}$ and $|\phi_{ij} - \phi'_{kl}| \le \epsilon_{ang}$ and $f(\tau_i, \tau_j, \ldots) = f(\tau'_k, \tau'_l, \ldots)$ then S = S + 1
8. End For
9. End For
10. Assign $S = S/\min\left(\frac{n(n-1)}{2}, \frac{m(m-1)}{2}\right)$ Step 6 of the example Algorithm 1 can be performed using the binary search in a sorted array and requires, on average, an O(log n) operations. While the nested loops in steps 4 and 5 bring the total number of operations up to $O(m^2 \log n)$—i.e., quadratic in the number of minutiae in the query template (typically, of a plain fingerprint), the latter number can be expected to be significantly smaller than the number of minutiae in the enrolled template (typically, of a rolled fingerprint). Existing alternatives, such as matching untransformed minutiae using the Hough transform, have at least a quadratic complexity although for matching templates this can be somewhat offset by heuristics such as matching geometric means of the two sets of minutiae. Note that step 7 of the example Algorithm 1 can be performed simultaneously for multiple values of $\epsilon_{dist}$ and S with a single set of floating-point operations and multiple computationally cheap array indexing operations (after integer quantization of $\epsilon_{dist}$). This and the fact that m<<n make Algorithm 1 numerically advantageous. Algorithm 1 (i.e., similarity score computation of (15)) is the only computationally intensive part of evaluating score probabilities (32).

Inference (29-33) and the scoring of Algorithm I may be illustrated through application to a pair of matching and non-matching fingerprints, e.g., from a publicly available database of biometric data. The templates may be transformed into quadruplets (13) and (9) that are input into the inference. The discriminant manifold (33) is approximated using a parameterized cubic polynomial (37).

An example implementation may use $\delta=1$, $\epsilon=1, \ldots, 9$, $\epsilon_{dist}=1, \ldots, 9$ and $n=m=20, \ldots, 99$. To apply the discriminant manifold and the resulting probability distribution (32) to pairs of templates with $n \neq m$, particular embodiments may apply the following heuristic: since rolled fingerprints are larger than plain ones, n>m, such embodiments may repetitively subsample m minutiae from the rolled fingerprint and compare the resulting sub-template to the query template. Particular embodiments estimate the intersection of such two m-minutiae templates to have $k=m^2/n$ common minutiae on average, and such embodiments may use this value k instead of n=m in (32), (33), and (37). However, this heuristic is unnecessary in other embodiments, as a bivariate polynomial or alternative approximation (38) can be used for $n \neq m$. For the prior $p(\lambda)=p(\epsilon)$ of perturbation standard deviation particular embodiments may use $p(\epsilon) \propto 1/\epsilon$, expressing the prior belief fact that very large perturbation are less likely, although other (e.g., more complex) prior formulations may be used, possibly informed by empirical measurements of real biometrics. The similarity measure (15) is sensitive to artifacts that affect the statistical distribution of distances between minutiae within each of the compared fingerprint templates. For example, image-related ridge terminations may be misidentified as physical ridge terminations and included in an untransformed template. Such artifacts introduce anomalous spatial and angular minutia distributions. Such spatial distribution anomalies can be detected at run time using domain-specific tests. As an example of the latter, if minutia locations are closely correlated with a fingerprint image boundary, and their orientations are transversal to the locus of the minutiae in question, that could indicate boundary artifacts. Similar effects may be observed with minutiae detected along fingerprint creases. Minutia rotation angles can be validated by comparison with local ridge orientation in raw fingerprint images with which minutiae rotation angles should be broadly consistent. A confidence measure that is evaluated by some minutiae extraction methods for each minutia can be used in an automated quality control step, or to create multiple input templates with varying confidence weights.

Particular embodiments may automatically generate template transformations or associated scoring functions (or both) in order to optimize the balance of accuracy and non-invertibility. For instance, particular embodiments may automatically determine an optimized transformation (1) for irreversibility and an optimized scoring function (14) for discriminative power. For example, assuming that template transformation mapping (1) and scoring function (14) are given in a parameterized form or as an ansatz:

$$\tau = \tau(t, \lambda_F, \xi_F, \theta_F) = F(t, \lambda_F, \xi_F, \theta_F) \tag{40}$$

and $$S_C(\tau_0, \tau, \lambda_S, \xi_S, \theta_F, \theta_C) = S_C(\tau_0(\lambda_F, \xi_F, \theta_F), \tau(\lambda_F, \xi_F, \theta_F), \lambda_S, \xi_S, \theta_C), \tag{41}$$

where $\theta_F$ and $\theta_C$ are parameter vectors that define the respective functional dependencies. For example, if F and $S_C$ are linear transformations $\theta_F$ and $\theta_C$ can be vectors or matrices of coefficients. If F and $S_C$ are feed-forward neural networks, then $\theta_F$ and $\theta_C$ are vectors of network weights, etc. Particular embodiments then select "optimal" values for $\theta_F$ and $\theta_C$ using the following steps. 1) Generate a large dataset of pairs of untransformed templates $$\{t_0^i, t^i, i = 1, \ldots, N_{data}\},$$

template transformation parameters $$\{\lambda_F^i, \xi_F^i\},$$

the corresponding transformed templates (34)

$$\{\tau_0^i, \tau^i\},$$

and Boolean indicators of matching $\{\alpha^i\}$ (all superscripts are i=1, . . . , $N_{data}$). 2) For each index i=1, . . . , $N_{data}$ generate vectors $$\lambda_S^i, \xi_S^i$$

and the corresponding vectors of scores $$\tilde{S}^i = S_C(\tau_0^i, \tau^i, \lambda_S^i, \xi_S^i, \theta_C).$$

3) Conduct the posterior probability estimation (here $$\xi^i = (\xi_F^i, \xi_S^i), \lambda = (\lambda_F^i, \lambda_S^i)):$$

$p(\alpha, \lambda|\xi^i, \tilde{S}^i\theta_F, \theta_C) \propto p(\tilde{S}^i|\lambda, \xi^i, \theta_F, \theta_C, \alpha)$, i=1, . . . , $N_{data}$.4) As before, the nuisance latent variable $\lambda$ is marginalized out, leaving a match probability conditioned on $\theta_F$ and $\theta_C$:

$$p_{match}^i(\alpha \mid \theta_F, \theta_C) = \int_{\lambda \in \Lambda} p\left(\alpha, \lambda \mid \xi^i, \tilde{S}^i, \theta_F, \theta_C\right) d\lambda \tag{42}$$

5) Estimate optimal $\theta_F$ and $\theta_C$ as solutions of the following logistic regression problem (equation (43)):

$$(\theta_F, \theta_C) = \operatorname{argmin} \sum_i -\alpha^i \log p_{match}(\alpha = 1 \mid \theta_F, \theta_C) - (1 - \alpha^i) \log p_{match}(\alpha = 0 \mid \theta_F, \theta_C) \tag{43}$$

6) Equation (43) maximizes discriminative power of the model but does not explicitly address the irreversibility of (40). The latter can be addressed by choosing a specific functional form of (40) that precludes practical recovery of the template t from $\tau(t, \lambda_F, \xi_F, \theta_F)$ as in (9,13). 7) Alternatively, a measure of entropy difference $H(\tau)-H(t)$ between the entropy of the transformed and untransformed templates can be subtracted from (43) if such a measure is available for (40).

8) Given a parameterized transform (40), then pose the problem of estimating the untransformed template t from the transformed one, $\tau(t, \lambda_F, \xi_F, \theta_F)$, for example, as an optimization problem:

$$w^* = \operatorname{argmin} \sum_i \left\| F[t^i] - F[\Phi(w, \theta_F)[\tau^i]] \right\|^2 = \operatorname{argmin} \sum_i \left\| F(t^i, \lambda_F, \xi_F, \theta_F) - F(\Phi(w, \theta_F)[F(t^i, \lambda_F, \xi_F, \theta_F)], \lambda_F, \xi_F, \theta_F) \right\|^2 \tag{44}$$

where $t^i$ and $\tau^i$ are the untransformed and transformed templates from the earlier discussion, and $\Phi(w)[\tau]$ is a parameterized operator mapping a transformed template into an untransformed one. For example, $\Phi(w, \theta_F)[\ ]$ can be a neural network with weights $w(\theta_F)$. Optimization can now formulate the objective, for example, as a constrained optimization problem: minimize (43) under the condition:

$$\sum_i \left\| F(t^i, \lambda_F, \xi_F, \theta_F) - F(\Phi(w^*, \theta_F)[F(t^i, \lambda_F, \xi_F, \theta_F)], \lambda_F, \xi_F, \theta_F) \right\|^2 \geq c > 0, \tag{45}$$

where alternative norms or misfits can be used instead of the $L_2$norm $\|\|$in (44) and (45). Informally, one can interpret the operator $\Phi(w, \theta_F)$ as trying to "defeat" the irreversibility of the template transform $F(t^i, \lambda_F, \xi_F, \theta_F)$.

The techniques described herein may be used for many different use cases in which using a biometric can verify some information, such as an identity or an access request. For example, embodiments may be used for user authentication or identification, automatic sharing of desensitized biometric data across user devices for setup-free device initialization, fast context-switching of multi-user environments, facilitated multi-factor authentication, and/or targeted advertisement and services, among other uses cases. Devices implementing the techniques described herein may include consumer devices, object and human recognition systems, security equipment, automotive and other vehicle operation equipment, and/or industrial machinery and industrial control equipment, among others.

Figure 4:
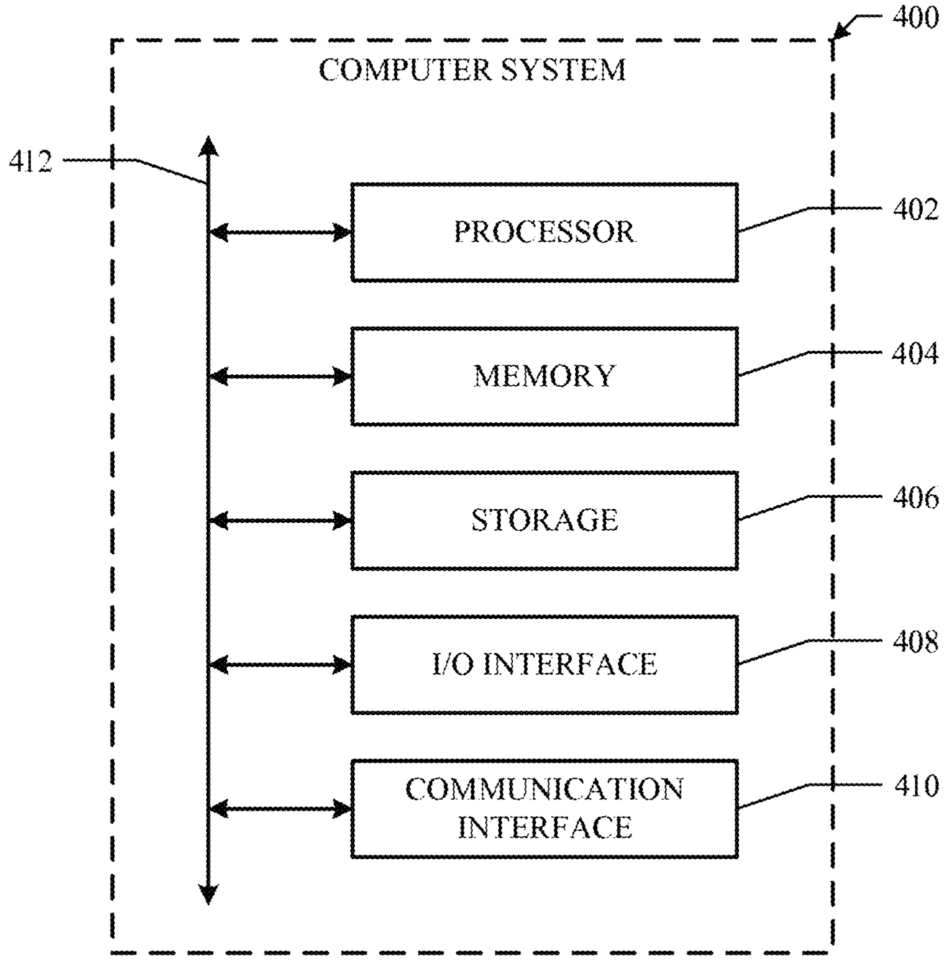
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate.

In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A computer-implemented method comprising:

accessing query biometric data associated with a verification request for a user;

applying a transformation to the query biometric data to generate a transformed query template representing the query biometric data;

accessing a transformed enrollment template comprising transformed enrollment biometric data of the user;

determining, based on a scoring function comparing the transformed query template and the transformed enrollment template a plurality of times, a plurality of similarity scores, wherein:

the scoring function comprises (1) one or more explicit parameters and (2) one or more latent parameters, each latent parameter having a value that is not directly measured;

each similarity score of the plurality of similarity scores is based on the one or more explicit parameters and the one or more latent parameters; and each similarity score is associated with a different value of at least one of the one or more latent parameters; and determining, based on the plurality of determined similarity scores, whether to grant or deny the verification request.

2. The method of claim 1, wherein the transformation is based on calculating a k-tuple characteristic for each of a plurality of k-tuples of distinctive biometric features in the query biometric data.

3. The method of claim 2, wherein each transformed template comprises a set of entries, each entry comprising: (1) a function of coordinates of multiple distinctive biometric features in k-tuples, (2) a function of angular orientations of multiple distinctive biometric features in k-tuples, and (3) a function of categorical attributes of distinctive biometric features in k-tuples.

4. The method of claim 2, wherein the k-tuples are pairs.

5. The method of claim 4 wherein each transformed template comprises a set of entries, each entry comprising: (1) a function of coordinates of a pair of distinctive biometric features, (2) a function of angular orientations of a pair of distinctive biometric features, and (3) a function of categorical attributes of distinctive biometric features.

6. The method of claim 2, wherein the similarity score is based on a number of elements in the transformed query biometric data that match any element in the transformed enrollment biometric data.

7. The method of claim 6, wherein a match between an element in the transformed query biometric data and an element in the transformed enrollment biometric data is determined based on a measure of similarity or difference between the one or more k-tuple characteristics determined for the transformed query data and the transformed enrollment biometric data.

8. The method of claim 6, wherein a match between an element in the transformed query biometric data and an element in the transformed enrollment biometric data is determined based on one or more of:

a difference between a relative distance in the transformed query biometric data and a relative distance in the transformed enrollment biometric data that is less than a threshold distance value; or a difference between a relative rotation angle in the transformed query biometric data and a relative rotation angle in the transformed enrollment biometric data that is less than a threshold angle value.

9. The method of claim 1, wherein at least one of the one or more latent parameters comprises an estimated amount of perturbation of the query biometric data.

10. The method of claim 1, wherein the determining whether to grant or deny the verification request comprises determining, based upon prior information, a probability that an observed statistical distribution of the plurality of similarity scores arises from matching query and enrolled biometric data.

11. The method of claim 1, wherein the one or more explicit parameters comprises one or more of:

a number of entries selected from each of the transformed query template and the transformed enrollment template;

an imaging resolution of a sensor used to capture the query biometric data or the enrollment biometric data;

a measure of distortion of at least one of the query biometric data or the enrollment biometric data based on at least one of prior information or sensor input; or a context associated with at least one of the query biometric data or the enrollment biometric data.

12. The method of claim 1, wherein the one or more latent parameters comprises one or more of:

a variance in each of one or more spatial coordinates of distinct biometric features measured in the query biometric data;

a variance in each of one or more angular coordinates of the distinct biometric features measured in the query biometric data;

an amount of noise in an output of a sensor used to measure the query biometric data; or an imaging resolution of a sensor used to capture the query biometric data or the enrollment biometric data.

13. The method of claim 1, wherein determining, based on the plurality of determined similarity scores, whether to grant or deny the verification request comprises:

determining, for each of the plurality of determined similarity scores, a match result between the transformed query template and the transformed enrollment template; and determining, based on each of the match results, whether to grant or deny the verification request.

14. The method of claim 13, wherein, for each match result, determining the match result comprises comparing the respective similarity score with a scoring threshold that is based on the particular values of at least some of the parameters of the scoring function.

15. The method of claim 14, wherein the scoring threshold is based on a score distribution corresponding to a plurality of matching biometrics and a score distribution corresponding to a plurality of non-matching biometrics.

16. The method of claim 15, wherein the scoring threshold is a manifold that separates the score distribution corresponding to the plurality of matching biometrics and the score distribution corresponding to the plurality of non-matching biometrics.

17. The method of claim 13, wherein each match result comprises a probability of a match or a probability of a non-match between the transformed query template and the transformed enrollment template.

18. The method of claim 17, wherein determining, based on each of the match results, whether to grant or deny the verification request comprises determining whether to grant or deny the verification request based on a weighted combination of each of the match results, wherein each match result is weighted by a probability associated with the particular value of at least one of the latent parameters.

19. The method of claim 18, wherein the weighted combination of each match result comprises a weighted sum of each match result.

20. The method of claim 13, further comprising:

determining, based on each of the match results, a match probability and a non-match probability;

determining whether an absolute value of a difference between the match probability and the non-match probability is greater than a threshold; and in response to a determination that absolute value of the difference between the match probability and the non-match probability is greater than the threshold, then determining whether to grant or deny the verification request based on the most probable of the match probability and the non-match probability.

21. The method of claim 20, further comprising:

accessing, in response to a determination that the absolute value of the difference between the match probability and the non-match probability is not greater than the threshold, additional query biometric data associated with the verification request for a user; and determining whether to grant or deny the verification request based on the plurality of determined similarity scores and on the additional query biometric data.

22. The method of claim 1, further comprising at least one of:

automatically determining the transformation by optimizing the transformation according to an irreversibility metric; or automatically determining the scoring function by optimizing the scoring function according to a discriminative metric.

23. The method of claim 1, wherein the query biometric data comprises at least one of:

a set of measured fingerprint minutiae;

a mathematical representation of an ocular iris image;

a mathematical representation of a retinal blood vessel image;

a mathematical representation of an image of at least a portion of a person's face;

a mathematical representation of a motion of at least a portion of a person's body; or a mathematical representation of one or more acoustic signatures of human speech.

24. One or more non-transitory computer readable storage media storing instructions and coupled to one or more processors that are operable to execute the instructions to:

access query biometric data associated with a verification request for a user;

apply a transformation to the query biometric data to generate a transformed query template representing the query biometric data;

access a transformed enrollment template comprising transformed enrollment biometric data of the user;

determine, based on a scoring function comparing the transformed query template and the transformed enrollment template a plurality of times, a plurality of similarity scores, wherein:

the scoring function comprises (1) one or more explicit parameters and (2) one or more latent parameters, each latent parameter having a value that is not directly measured;

each similarity score of the plurality of similarity scores is based on the one or more explicit parameters and the one or more latent parameters; and each similarity score is associated with a different value of at least one of the one or more latent parameters; and determine, based on the plurality of determined similarity scores, whether to grant or deny the verification request.

25. An apparatus comprising one or more non-transitory computer readable storage media storing instructions; and one or more processors coupled to the non-transitory computer readable storage media, the one or more processors operable to execute the instructions to:

access query biometric data associated with a verification request for a user;

apply a transformation to the query biometric data to generate a transformed query template representing the query biometric data;

access a transformed enrollment template comprising transformed enrollment biometric data of the user;

determine, based on a scoring function comparing the transformed query template and the transformed enrollment template a plurality of times, a plurality of similarity scores, wherein:

the scoring function comprises (1) one or more explicit parameters and (2) one or more latent parameters, each latent parameter having a value that is not directly measured;

each similarity score of the plurality of similarity scores is based on the one or more explicit parameters and the one or more latent parameters; and each similarity score is associated with a different value of at least one of the one or more latent parameters; and determine, based on the plurality of determined similarity scores, whether to grant or deny the verification request.

26. The apparatus of claim 25, wherein the transformation is based on calculating a k-tuple characteristic for each of a plurality of k-tuples of distinctive biometric features in the query biometric data, and wherein the k-tuples are pairs.

* * * * *